April 6, 1926.
H. J. NEWTON-CLARE
1,579,563
MOTIVE POWER UNIT FOR DRIVING LAWN MOWERS AND SIMILAR IMPLEMENTS
Filed March 9, 1923 3 Sheets-Sheet 1
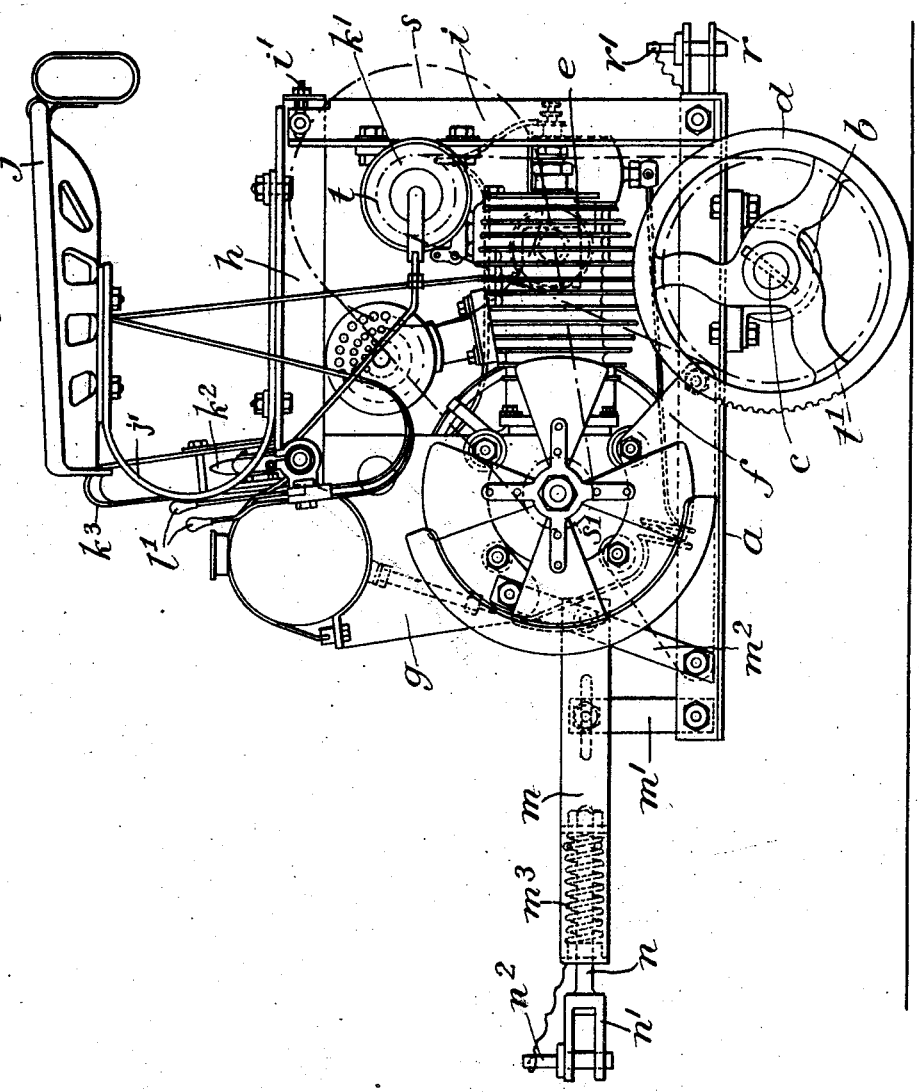
Inventor
Herbert John Newton-Clare
Attorneys

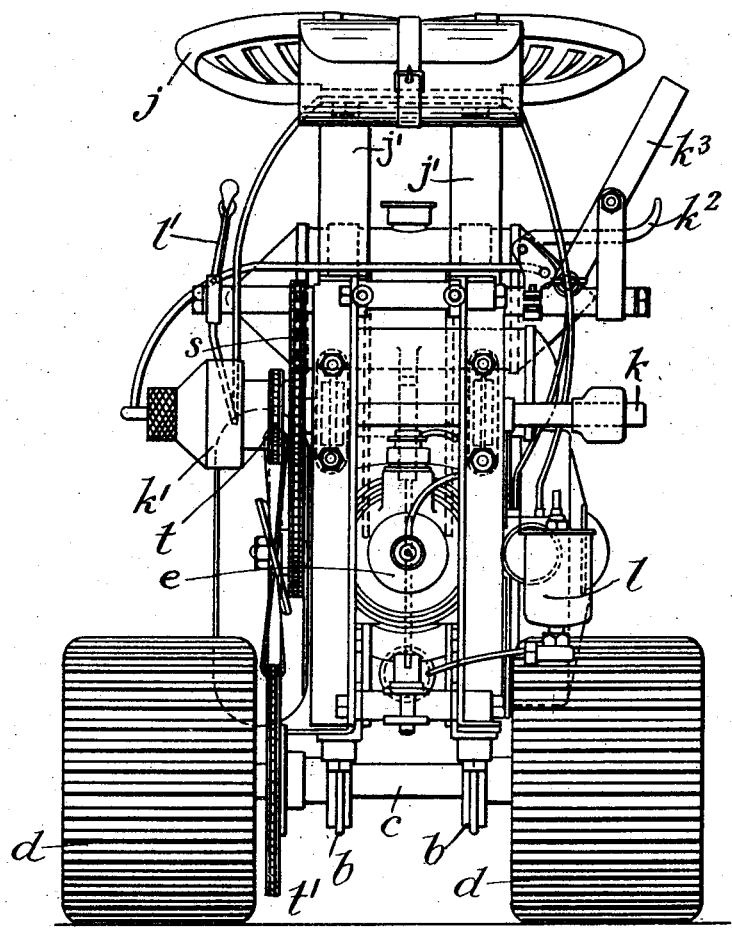

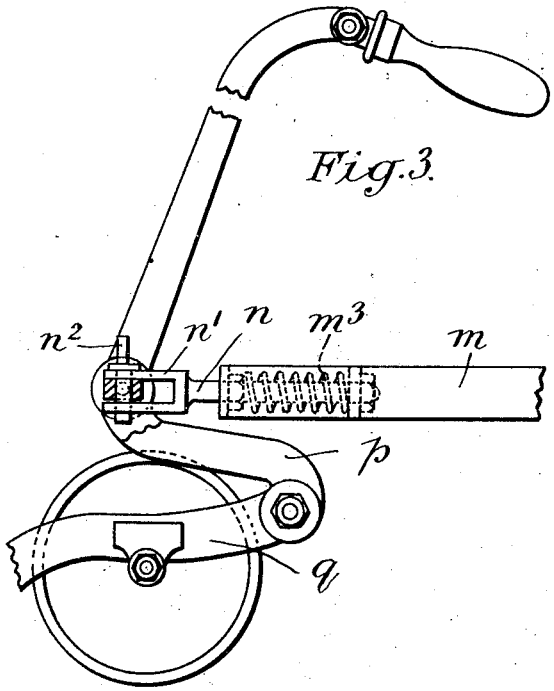
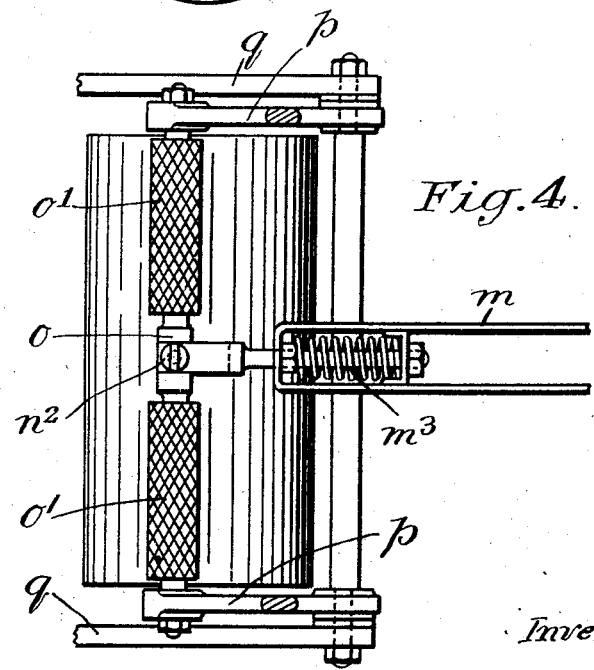

Patented Apr. 6, 1926.

1,579,563

UNITED STATES PATENT OFFICE.

HERBERT JOHN NEWTON-CLARE, OF GERRARDS CROSS, ENGLAND.

MOTIVE-POWER UNIT FOR DRIVING LAWN MOWERS AND SIMILAR IMPLEMENTS.

Application filed March 9, 1923. Serial No. 623,997.

*To all whom it may concern:*

Be it known that HERBERT JOHN NEWTON-CLARE, of "Fairleigh," Gerrards Cross, in the county of Buckingham, England (whose post-office address is "Fairleigh," Gerrards Cross, in the county of Buckingham, England), a subject of the King of Great Britain and Ireland, has invented certain new and useful Improvements in Motive-Power Units for Driving Lawn Mowers and Similar Implements, of which the following is a specification.

This invention for an improved motive power unit for driving lawn mowers and similar implements has for its object to enable lawn mowers to be driven and controlled with greater ease and less fatigue than heretofore, also to provide a self-contained and readily detachable power unit which can be readily applied to existing lawn mowers.

According to this invention a motor carriage hereafter referred to as a "motor pusher" capable of being coupled behind a lawn mower or other vehicle is constructed to carry the operator or driver and is equipped with an internal combustion motor which drives ground wheels or rollers on which the carriage or frame is supported, whilst a forwardly extending portion of said carriage or frame is provided with a coupling member adapted to engage a coupling member fixed to the frame of the lawn mower or other machine or implement to be driven. Means are also provided for putting the motor shaft into and out of gear with the ground wheels or rollers of the motor pusher.

In one way of carrying the invention into practical effect as applied to a lawn mower, the main frame of the motor pusher comprises a pair of spaced longitudinal side members supported by the bearings of an axle upon which the ground wheels or rollers are mounted. A front or coupling frame is connected to the main frame, and has forwardly converging sides carrying a fork ended spring supported coupling rod adapted to take over and be secured to a cross bar in the lower part of the mower frame by means of a cotter or coupling pin passed through eyes or sockets in both parts.

The motor is mounted on the main frame and its shaft is geared by chain and sprocket gear with a counter shaft which carries a second sprocket connected by a drive chain with the axle of the ground wheels or rollers, the second sprocket on the counter shaft being provided with clutch means serving to render the drive connection between the motor and the ground wheels or rollers operative or inoperative as required.

The seat is supported above the motor on brackets fixed to the main frame and is positioned at a convenient distance from the steering handles of the mower, the controls for the motor and the gear drive being arranged in a convenient position for operation by the driver when sitting on the seat.

The invention is hereinafter more fully described with reference to the accompanying drawings in which:—

Figs. 1 and 2 are respectively side and rear elevation of my improved power unit or motor pusher.

Fig. 3 is a side elevation partly in section of the rear portion of a lawn mower showing the method of coupling the power unit thereto and, Fig. 4 is a plan of the same.

Referring to Figs. 1 and 2 it will be seen that the improved motive power unit comprises a main frame composed of two spaced longitudinal side members $a$ firmly connected together and mounted upon the bearings $b$ in which the axle $c$ of the ground wheels or rollers $d$ rotates. A single cylinder internal combustion engine $e$ is mounted in a horizontal position upon said members $a$ its crank case being connected to said members by means of a pair of suitably shaped plates $f$. Two other plates $g$ bolted to the upper part of the engine crank case serve to carry a pair of spaced upper frame members $h$ the rear ends of which are supported by vertical members $i$ pivoted to the lower members $a$ and capable of slight sliding movement at the upper ends in reference to the upper members $h$ when adjusted by screw means $i'$.

The seat $j$ for the operator is supported above the upper frame members $h$ by a pair of U-shaped irons $j'$ bolted to the seat and to said members. By seating the operator on the motor pusher not only can the mowing machine and the motor pusher be effectively controlled with very little effort on the part of the driver, but the mowing operations are expedited as the speed of the machine is not restricted to a walking pace as in the case where the driver or operator is compelled to walk.

Furthermore the weight of the driver assists in holding down the ground wheels or rollers $d$ and ensures adequate friction between the wheels and the ground for the propulsive effort required.

A counter shaft $k$ rotating in ball bearings mounted on the upright members $i$ and capable of vertical adjustment relatively thereto carries a fast sprocket $s$ connected by a driving chain with a sprocket $s'$ on the engine shaft, and a second sprocket $t$ controlled by means of a plate clutch $k'$ and connected by a chain with a sprocket $t'$ fast on the axle $c$ of the ground wheels. The control lever $k^2$ of the clutch $k'$ is arranged in proximity to the driver's seat and a second lever $k^3$ pivoted with a friction tight joint is provided to depress and retain the clutch lever in a depressed position when required. The carburettor $l$ of the engine is fitted with Bowden wire controls, the levers $l'$ of which are positioned adjacent the seat $j$ so as to be within convenient reach of the driver.

The tension of the driving chains extending from the motor shaft to the countershaft and from the countershaft to the ground wheel axle is capable of adjustment as required. To take up slack from the latter chain the bearings of the counter shaft may be raised slightly upon the uprights $i$ whilst the tension of the other chain is regulated by moving said uprights angularly by means of the screw adjusting means $i'$ at the upper ends of the uprights.

The engine is started by applying a detachable hand crank to the free end of the shaft $k$, the clutch being meanwhile disengaged, or a kick starter may be fitted.

An air fan attached to the engine shaft is provided to promote the cooling of the engine.

At the front of the main frame a substantially U-shaped coupling frame $m$ is attached, the coupling frame being bolted to two short uprights $m'$ and also to two inclined stays $m^2$ extending between the plates $g$ and the side members $a$. A coupling rod $n$ having a forked head $n'$ and detachable coupling pin $n^2$ is mounted to slide in the forward end of the coupling frame $m$ and is constantly pressed forward by means of a spring $m^3$.

As shown in Figs. 3 and 4 the coupling rod $n$ is adapted to take over the centre portion of a coupling bar $o$ extending transversely of the rear part of the mowing machine and be secured thereto by the coupling pin $n^2$ being passed through aligned holes in the parts. This transverse coupling bar may conveniently serve at $o'$ as foot rests for the driver of the power unit.

In order to raise the handles of the lawn mower into a convenient position for holding by the driver seated on the motor carriage, and to bring the transverse coupling bar to a position over the line of contact of the roller of the mower with the ground, the handle frame and coupling bar are mounted upon a pair of forwardly and upwardly directed arms or brackets $p$ firmly fixed at their rear ends to the rear end of the mower frame $q$ and at their front ends to the ends of the coupling bar and handle bar member $o$. This arrangement reduces the over all length of the combination when in use.

A forked coupling member $r$ with a detachable pin $r'$ may be secured to the rear end of the main frame to enable a ground roller to be coupled behind the pusher. Though the motive power unit is described above as chiefly applicable to the pushing of lawn mowers and the hauling of rollers, it will be evident that it may be employed for other purposes as for example in moving low wheeled trucks in works, warehouses and the like.

I claim:—

1. A motor pusher for lawn mowers and other vehicles comprising corrugated wide rimmed ground rollers, a frame having lower side members mounted on the axle of said rollers, and upper side members suitably supported at their forward ends, rear upright members pivotally connected at their lower ends to the rear ends of said lower side members and having a forwardly and rearwardly adjustable connection at their upper ends with the rear ends of said upper side members, a motor mounted in said frame, vertically adjustable bearings on said rear upright members, a counter shaft mounted in said bearings, a sprocket gear fixedly mounted on said shaft, a similar gear on the shaft of the motor, a chain connecting said gears and adapted to be tightened by the adjustable movement of the upper ends of the rear upright members of the frame, a second sprocket gear loose on said counter shaft, a similar gear fixed on the axle of said ground rollers, a chain connecting said gears and adapted to be tightened by the vertical adjustment of said counter shaft, a clutch for connecting said loose sprocket with the counter shaft, and levers suitably connected with said clutch for operating the same.

2. A motor pusher for lawn mowers and other vehicles comprising ground rollers, a main frame having lower side members mounted on the axle of said rollers and upper side members, front and rear supporting members for said upper side members, said rear supporting members being adjustable forwardly and rearwardly at their upper ends, a coupling bar and handle frame connected to the forward end of said main frame, a motor arranged in said main frame, a seat supported on said upper side members above said motor, and steering handles projecting upwardly from said handle frame in position to be conveniently reached by the operator.

In testimony whereof he has affixed his signature.

HERBERT JOHN NEWTON-CLARE.